United States Patent

Kato

[11] Patent Number: 5,875,057
[45] Date of Patent: Feb. 23, 1999

[54] EYEPIECE LENS SYSTEM

[75] Inventor: Masato Kato, Otsu, Japan

[73] Assignee: Minolta Co., Ltd., Osaka, Japan

[21] Appl. No.: 994,721

[22] Filed: Dec. 19, 1997

[30] Foreign Application Priority Data

Dec. 24, 1996 [JP] Japan .................................. 8-344048

[51] Int. Cl.$^6$ ............................ G02B 25/00; G02B 13/18
[52] U.S. Cl. ............................................. 359/645; 359/716
[58] Field of Search .................................. 359/643, 644, 359/645, 708, 713, 714, 715, 716

[56] References Cited

U.S. PATENT DOCUMENTS 5,701,475  12/1997  Sugawara ............................... 359/645
5,726,808  3/1998  Suzuki ..................................... 359/645

FOREIGN PATENT DOCUMENTS 8-344048  12/1996  Japan .

*Primary Examiner*—Scott J. Sugarman
*Attorney, Agent, or Firm*—Sidley & Austin

[57] ABSTRACT

An eyepiece lens system has, from the pupil side and proceeding toward the object side, a first lens unit having a positive refractive power, a second lens unit having a positive refractive power, and a third lens unit having a positive refractive power. At least one of the first lens unit and the second lens unit has at least one aspherical surface, and the eyepiece lens system fulfills the following condition:

$$0.55 < \frac{f^3}{d_0} \cdot \left( \frac{\phi_1}{r_1} + \frac{\phi_2}{r_3} + \frac{0.116}{r_5} \right) < 0.85$$

where, f represents a focal length of the entire eyepiece lens system;

$d_0$ represents an eye-relief;

$\phi_1$ represents a refractive power of the first lens unit;

$\phi_2$ represents a refractive power of the second lens unit;

$r_1$ represents a radius of curvature of a pupil side surface of the first lens unit;

$r_3$ represents a radius of curvature of a pupil side surface of the second lens unit; and $r_5$ represents a radius of curvature of a pupil side surface of the third lens unit.

25 Claims, 7 Drawing Sheets

EYEPIECE LENS SYSTEM

FIELD OF THE INVENTION

The present invention pertains to an eyepiece lens system which is suited for use in a pair of binoculars, a telescope, or a microscope.

BACKGROUND OF THE INVENTION

Conventionally, Japanese Patent Laid-Open (A) 8-68953 proposes an eyepiece lens system having a long eye-relief (the distance between the pupil and the lens surface of the eyepiece lens system which is closest to that pupil. This conventional eyepiece lens system comprises, from the pupil side and proceeding toward the object side, a first-lens unit having a positive refractive power, a second lens unit having a positive refractive power, and a third lens unit having a positive refractive power.

However, the eyepiece lens system disclosed in the above Patent Laid-Open document has a problem in that both a field curvature and a distortion are not corrected with a good balance.

OBJECTS AND SUMMARY OF THE INVENTION

The present invention was created in view of these points. Its object is to provide an eyepiece lens system having a long eye-relief, wherein both the field curvature and the distortion are corrected with a good balance.

In order to achieve the above object, an eyepiece lens system comprises, from the pupil side and proceeding toward the object side, a first lens unit having a positive refractive power, a second lens unit having a positive refractive power, and a third lens unit having a positive refractive power, wherein at least one of the first lens unit and the second lens unit has at least one aspherical surface, and wherein the eyepiece lens system fulfills the following condition:

$$0.55 < \frac{f^3}{d_0} \cdot \left( \frac{\phi_1}{r_1} + \frac{\phi_2}{r_3} + \frac{0.116}{r_5} \right) < 0.85$$

where, f represents the focal length of the entire eyepiece lens system;

$d_0$ represents the eye-relief;

$\phi_1$ represents the refractive power of the first lens unit;

$\phi_2$ represents the refractive power of the second lens unit;

$r_1$ represents the radius of curvature of the pupil side surface of the first lens unit;

$r_3$ represents the radius of curvature of the pupil side surface of the second lens unit; and $r_5$ represents the radius of curvature of the pupil side surface of the third lens unit.

The pupil side surface of a lens unit is the side surface thereof which is closest to the pupil side of the eyepiece lens system.

These and other objects, advantages and features of the invention will become apparent from the following description thereof taken in conjunction with the accompanying drawings which illustrate specific embodiments of the invention.

BRIEF DESCRIPTION OF THE DRAWINGS

The present invention, both as to its organization and its manner of operation, together with further objects and advantages thereof, may best be understood by reference to the following detailed description, taken in connection with the accompanying drawings wherein.

DETAILED DESCRIPTION OF THE PREFERRED EMBODIMENTS

Presently preferred embodiments of the present invention are explained below.

Figure 1:
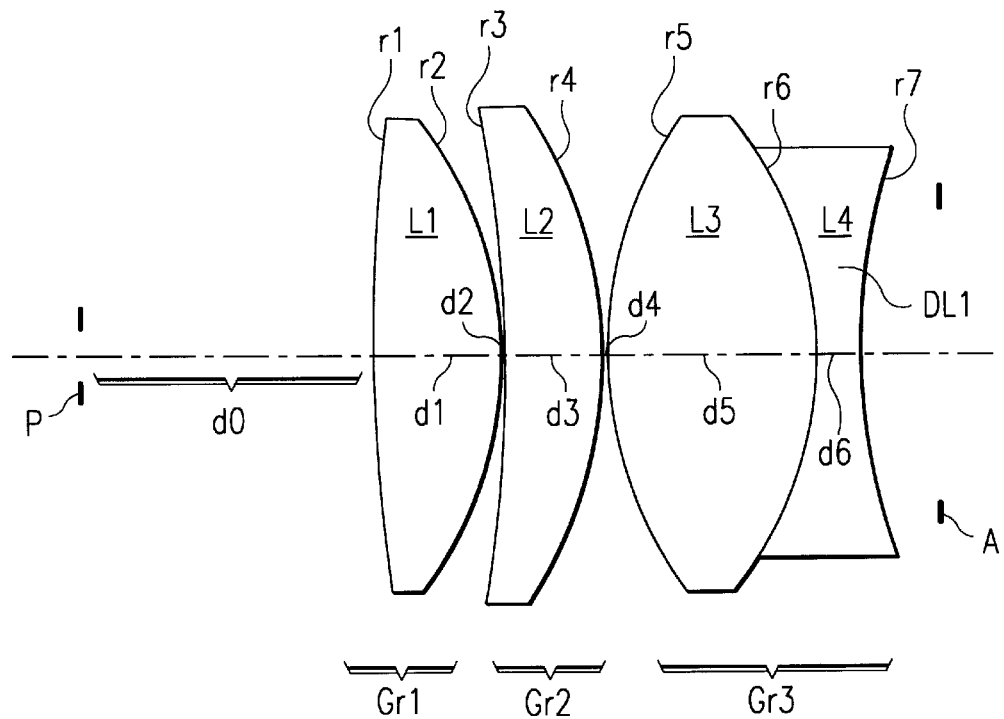
FIG. 1 is a schematic representation of a first embodiment of the eyepiece lens system in accordance with the invention.
Figure 2:
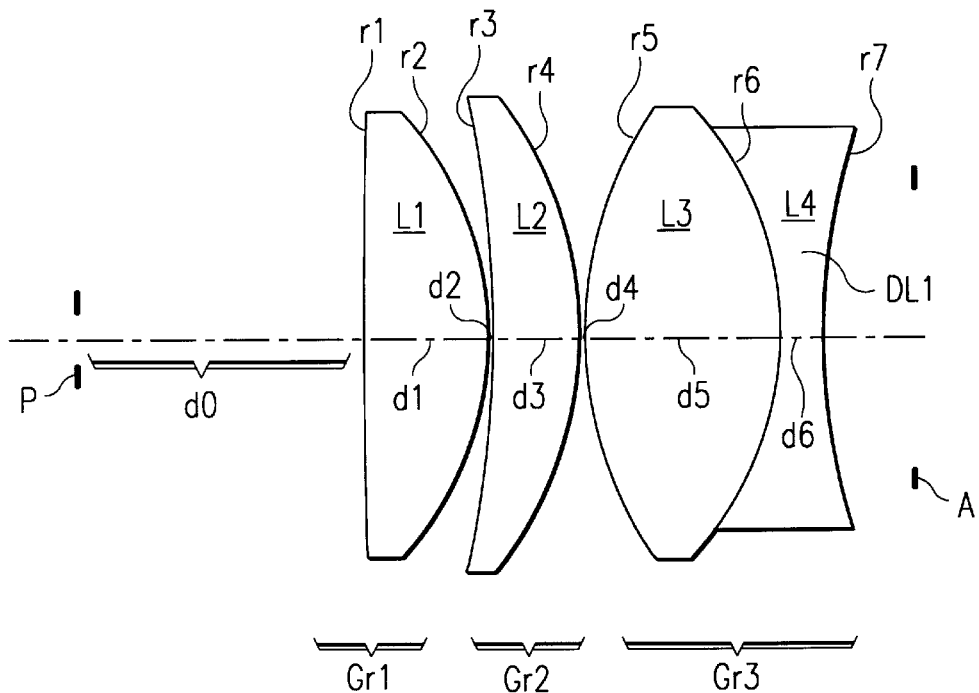
FIG. 2 is a schematic representation of a second embodiment of the eyepiece lens system in accordance with the invention.
Figure 3:
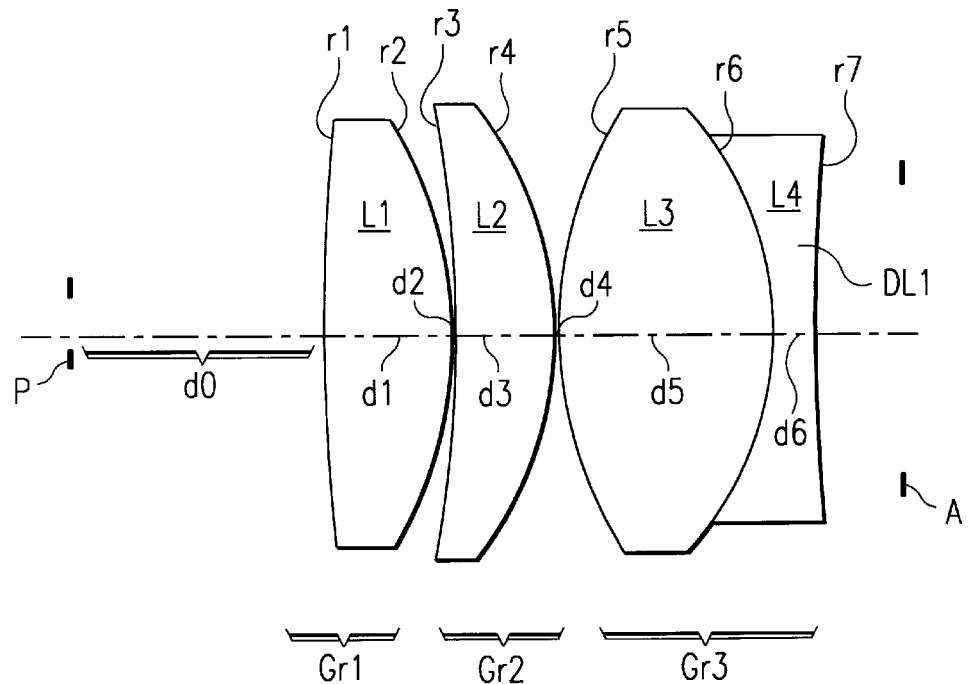
FIG. 3 is a schematic representation of a third embodiment of the eyepiece lens system in accordance with the invention.
Figure 4:
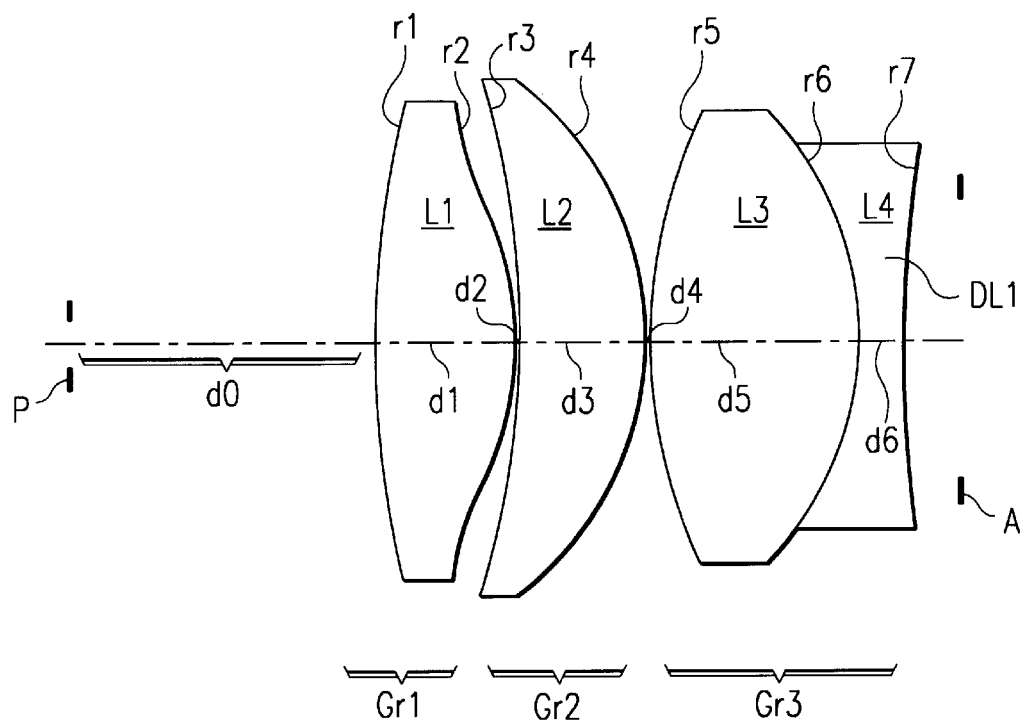
FIG. 4 is a schematic representation of a fourth embodiment of the eyepiece lens system in accordance with the invention.
Figure 5:
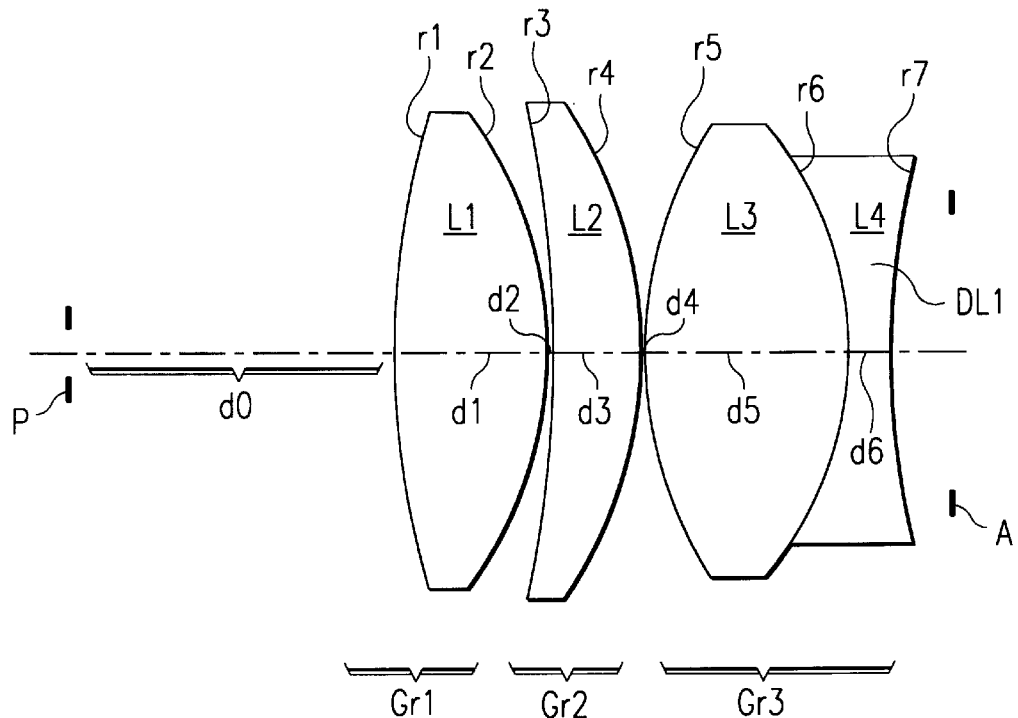
FIG. 5 is a schematic representation of a fifth embodiment of the eyepiece lens system in accordance with the invention.
Figure 6:
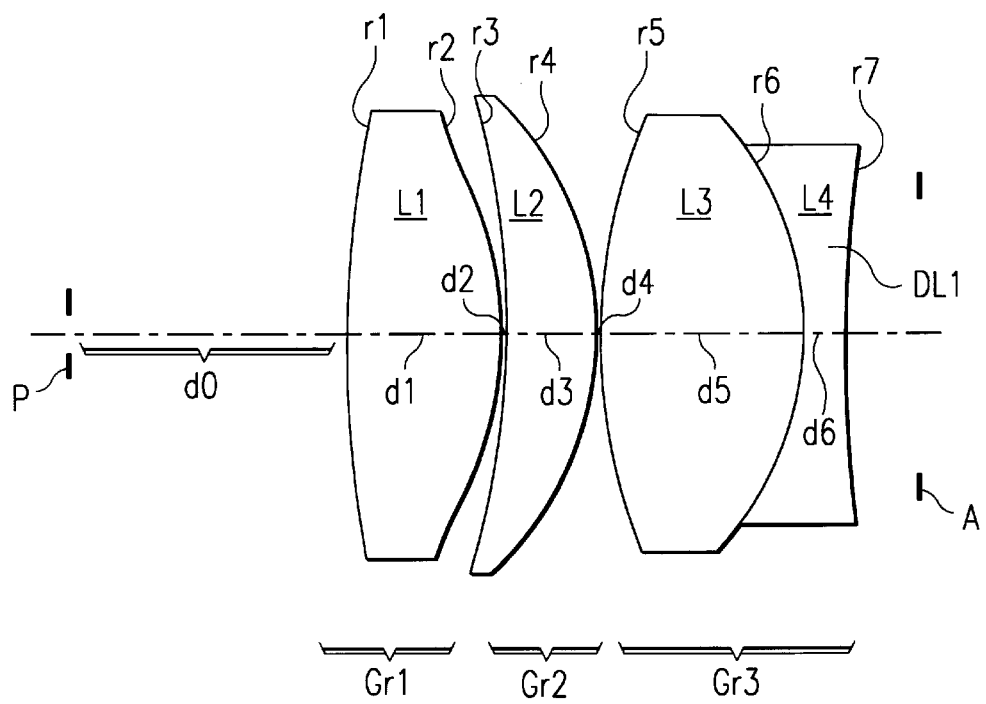
FIG. 6 is a schematic representation of a sixth embodiment of the eyepiece lens system in accordance with the invention.
Figure 7:
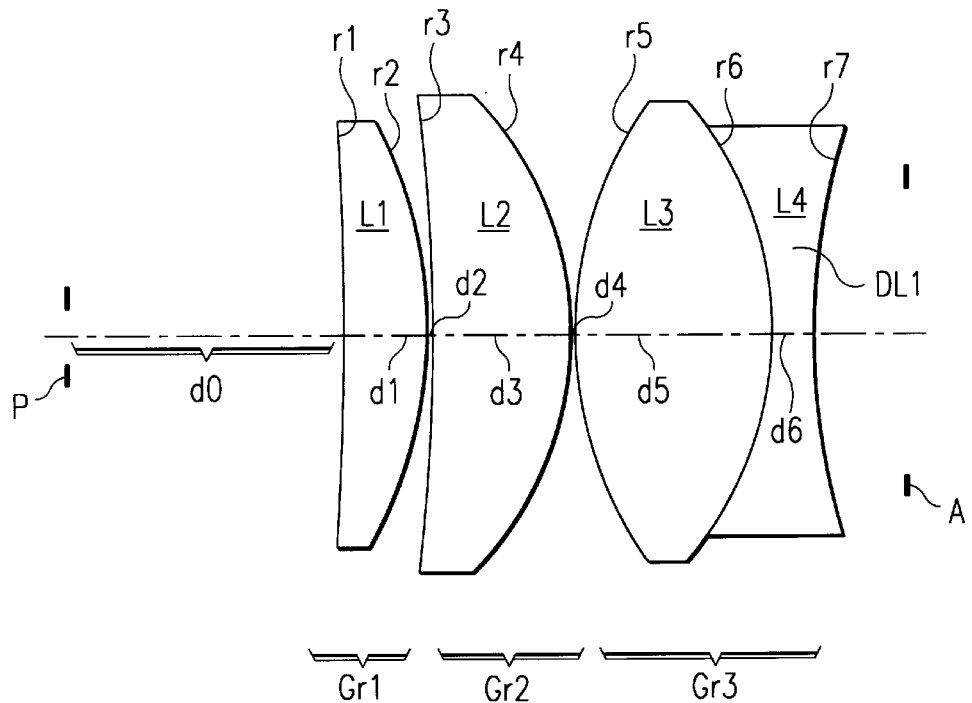
FIG. 7 is a schematic representation of a seventh embodiment of the eyepiece lens system in accordance with the invention.

FIGS. 1 through 7 show schematic representations of seven embodiments of the eyepiece lens system of the present invention. Each eyepiece lens system comprises, from the pupil side and proceeding toward the object side, a first lens unit Gr1, having a positive refractive power and consisting of a first positive lens element L1; a second lens unit Gr2, having a positive refractive power and consisting of a positive meniscus lens element L2 whose pupil side surface is concave; and a third lens unit Gr3, having a positive refractive power and consisting of a positive doublet lens element DL1, which is formed by cementing together a bi-convex lens element L3 and a bi-concave lens element L4 so that the bi-convex lens element L3 is positioned between the second lens unit L2 and the bi-concave lens element L4. The configuration of the first lens element L1 of each of the first through the sixth embodiments is a bi-convex shape, and that of the seventh embodiment is a positive meniscus shape whose pupil side surface is concave. In the figures, the symbol A shows a position of the aperture, the symbol P shows a position of the pupil, and the symbol do shows the eye-relief.

As mentioned above, it is desirable that the eyepiece lens system employs the positive-positive-positive type of three component construction, in which the eyepiece lens system comprises, from the pupil side and proceeding toward the object side, a first positive lens element L1; a second positive lens element L2; and a doublet lens element DL1, which can be formed by cementing together a positive lens element L3 and a negative lens element L4 so that the positive lens element L3 is positioned between the second lens unit L2 and the negative lens element L4. When the three component construction is employed, a negative refractive power of the entire eyepiece lens system is provided on the object side position of the eyepiece lens system. Therefore, the construction can provide a long eye-relief.

Of the illustrated embodiments, each of the first and second embodiments has an aspherical surface at the object side surface r2 of the first lens unit Gr1 and at the object side surface r4 of the second lens unit Gr2. Each of the third through the sixth embodiments has an aspherical surface at the object side surface r2 of the first lens unit Gr1. Further, the seventh embodiment has an aspherical surface at the object side surface r4 of the second lens unit Gr1.

As mentioned above, it is desirable that at least one object side surface of at least one of the first lens unit and the second lens unit is aspherical. Employing such a construction, both the field curvature and the distortion can be corrected with a good balance.

The condition that the eyepiece lens systems of the invention should fulfill is explained below.

It is preferred that the following condition (1) be met in the eyepiece lens system of the invention.

$$0.55 < \frac{f^3}{d_0} \cdot \left( \frac{\phi_1}{r_1} + \frac{\phi_2}{r_3} + \frac{0.116}{r_5} \right) < 0.85 \qquad (1)$$

where,
- f represents the focal length of the entire eyepiece lens system;
- $d_0$ represents the eye-relief;
- $\phi_1$ represents the refractive power of the first lens unit;
- $\phi_2$ represents the refractive power of the second lens unit;
- $r_1$ represents the radius of curvature of the pupil side surface of the first lens unit;
- $r_3$ represents the radius of curvature of the pupil side surface of the second lens unit; and
- $r_5$ represents the radius of curvature of the pupil side surface of the third lens unit.

The condition (1) is the condition for correcting both the field curvature and the distortion with a good balance when at least one of the object side surface of the first lens unit and the object side surface of the second lens unit is an aspherical surface.

If the eyepiece lens system exceeds the upper limit of condition (1), the desirable image performance is not satisfied, since a distortion becomes undercorrected by the aspherical surface provided in order to correct the field curvature. On the other hand, if the eyepiece lens system is less than the lower limit of the condition (1), the desirable image performance is also not satisfied, since a distortion becomes overcorrected by the aspherical surface.

The condition (1) is explained in detail below. With regard to the lens elements L2 and DL1, in order to simultaneously correct both the field curvature and the distortion with a good balance, the convex curvature of the pupil side surface r5 of the first doublet lens element DL1 is strengthened, so that the pupil side surface r1 of the first lens element L1 tends to change the sign of the curvature from positive to negative. In other words, if the positive value of 1/r5 increases and the negative value of 1/r1 decreases, it is possible that the eyepiece lens system corrects a distortion.

On the other hand, with regard to the lens elements L1 and L2, in order to simultaneously correct both the field curvature and the distortion with a good balance, the concave curvature of the pupil side surface r3 of the second lens element L2 is strengthened, so that the pupil side surface r1 of the first lens element L1 tends to change the sign of the curvature from negative to positive. In other words, if the negative value of 1/r3 decreases and the positive value of 1/r1 increases, it is possible that the eyepiece lens system corrects a distortion.

Moreover, with regard to the eye-relief do, the longer the eye-relief, the smaller the distortion.

Based on the above features, the inventor found that, when the eyepiece lens system comprises the positive first lens unit Gr1, the positive second lens unit Gr2, and the positive third lens unit Gr3, and an object side surface in at least one of the first lens unit and the second lens unit is aspherical, both the field curvature and the distortion can be simultaneously controlled by controlling the following parameter (1)'. The condition (1) is determined by defining the numerical area of the parameter (1)' so as to fulfill the optical performance.

$$W = \frac{f^3}{d_0} \cdot \left( \frac{\phi_1}{r_1} + \frac{\phi_2}{r_3} + \frac{0.116}{r_5} \right) \qquad (1)'$$

Further, it is preferred that the following condition (2) be met in the eyepiece lens system of the invention.

$$\frac{1}{r_1} > 0 \qquad (2)$$

The condition (2) defines that the pupil side surface r1 of the first lens element L1, i.e., the pupil side surface of the, entire eyepiece lens system, is a convex surface. Comparing the convex surface with a concave surface or a planar surface, since the holding member which holds the eyepiece lens system can be provided so as to separate from the pupil and the distance between the eyepiece lens system and the pupil can be substantially increased, the case in which the pupil side surface is convex (i.e., the condition (2) is satisfied) is better than the case in which the pupil side surface is concave or planar (i.e., the condition (2) is not met).

Tables 1 through 7 show specific representations corresponding to the first to the seventh embodiments, respectively, described above. In each table, r1 (i=1, 2, 3, . . . ) represents the radius of curvature of the ith lens surface from the pupil; di (i=1, 2, 3, . . . ) represents the ith axial distance from the pupil; and Ni (i=1, 2, 3, . . . ) and vi (i=1, 2, 3, . . . ) represent the refractive index and the Abbe number with regard to the d-line (i.e., $586.56*10^{-9}$ m) of the ith lens from the pupil, respectively. Further, in each table, the symbol do shows the eye-relief, the symbol f shows the focal length of the entire eyepiece lens system, the symbol $\phi 1$ shows the refractive power of the first lens unit, the symbol $\phi 2$ shows the refractive power of the second lens unit, and the symbol W shows the value corresponding to the condition (1).

In each embodiment, the surfaces marked with asterisks in the radius of curvature column are aspherical. The configuration of an aspherical surface is defined by the equation shown below:

$$x(y) = \frac{C \cdot y^2}{1 + \sqrt{1 - \epsilon \cdot C^2 \cdot y^2}} + \sum_{i \geq 2} Ai \cdot y^i$$

where,
- x represents the height in a direction vertical to the optical axis;
- y represents the amount of displacement from the reference spherical surface along the optical axis;

C represents the paraxial curvature;

ε represents the quadratic surface parameter; and

Ai represents the ith aspherical coefficient.

Figures 8A, 8B:
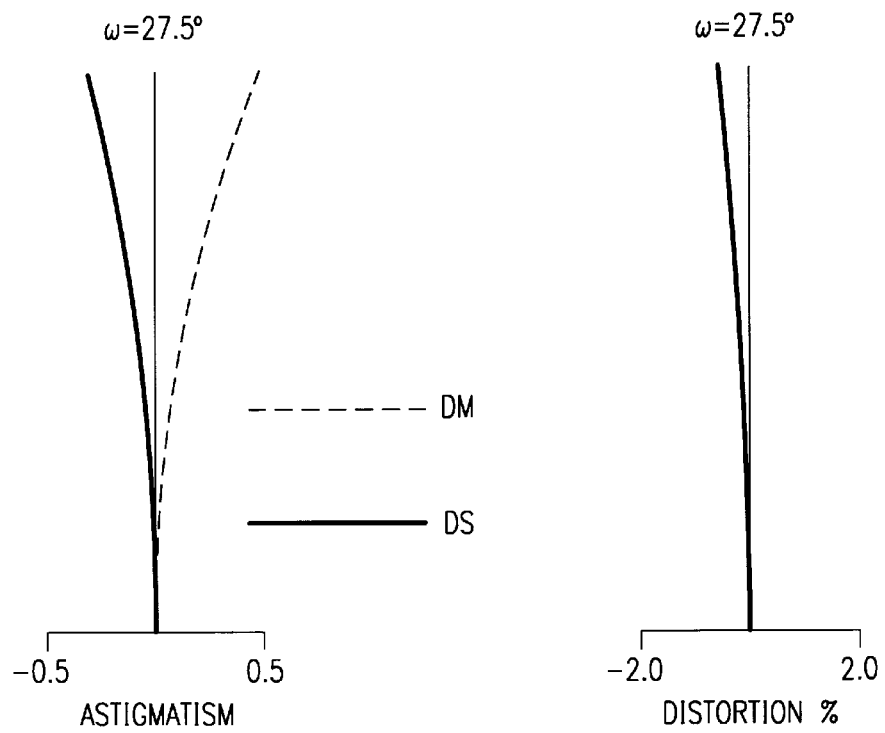
FIGS. 8A and 8B show aberration curves of the first embodiment of the eyepiece lens system.
Figures 9A, 9B:
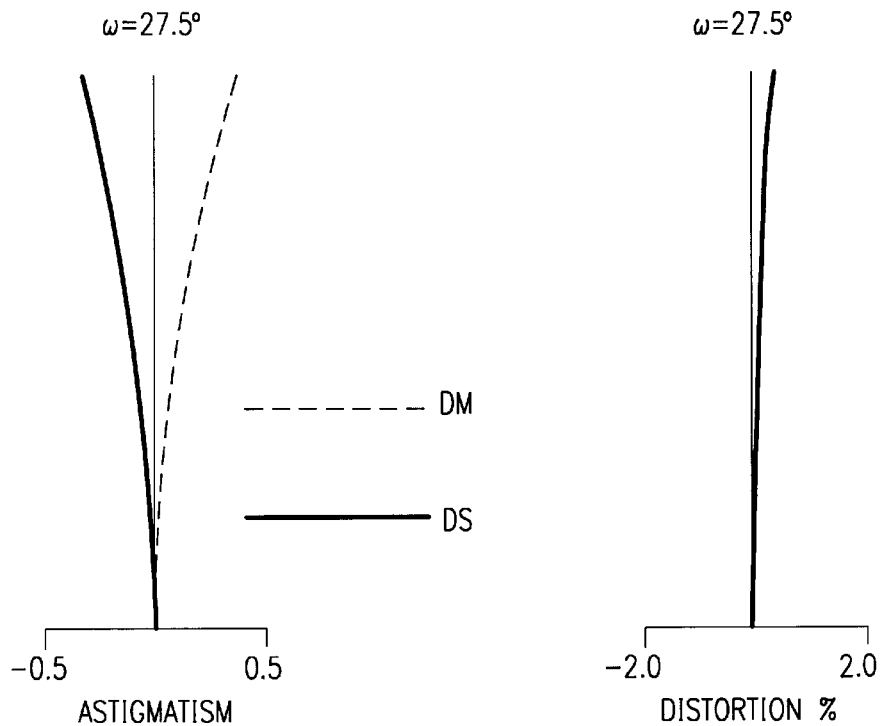
FIGS. 9A and 9B show aberration curves of the second embodiment of the eyepiece lens system.
Figures 10A, 10B:
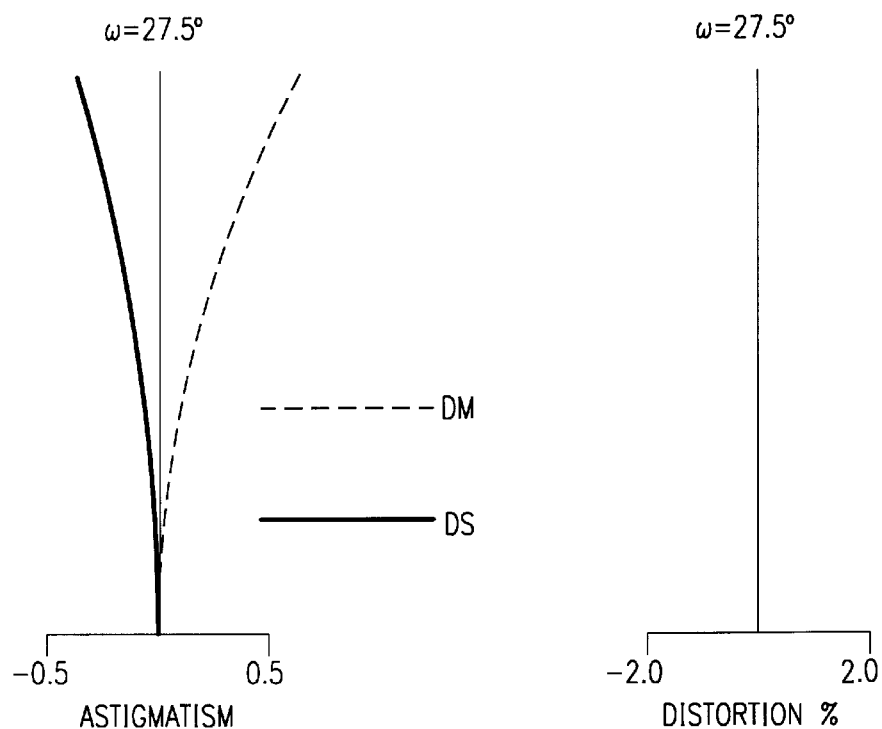
FIGS. 10A and 10B show aberration curves of the third embodiment of the eyepiece lens system.
Figure 11A:
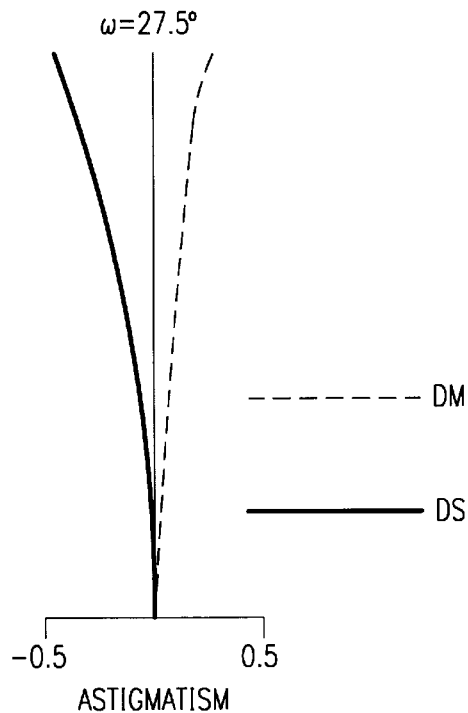
FIGS. 11A and 11B show aberration curves of the fourth embodiment of the eyepiece lens system.
Figure 11B:
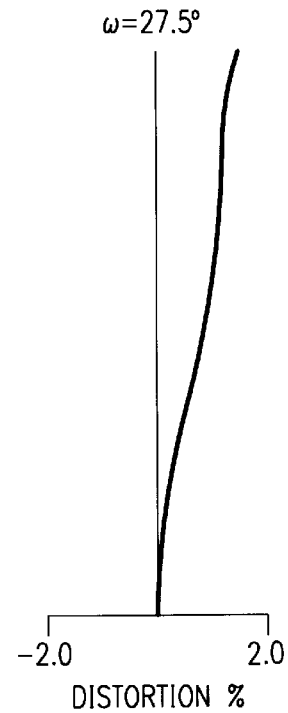
Figure 12A:
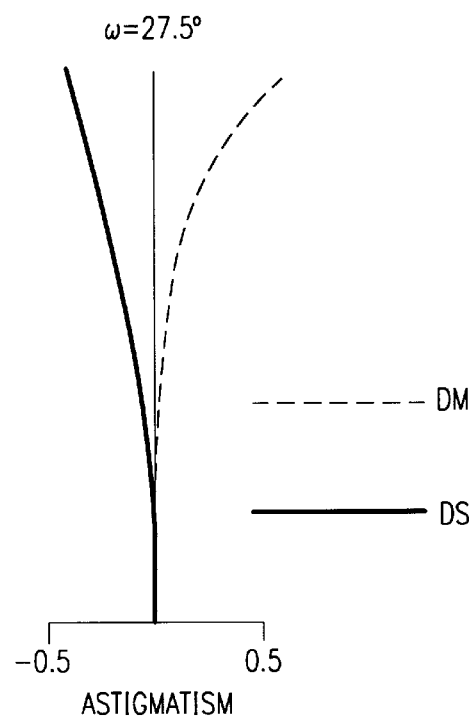
FIGS. 12A and 12B show aberration curves of the fifth embodiment of the eyepiece lens system.
Figure 12B:
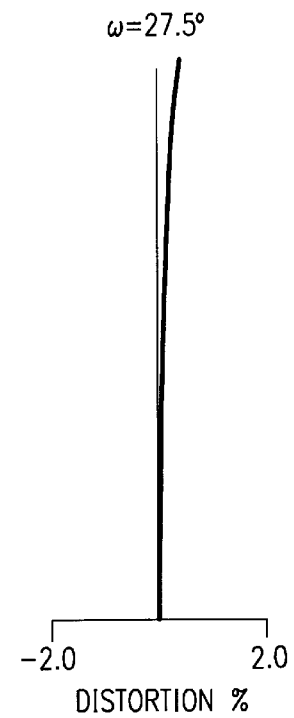
Figure 13A:
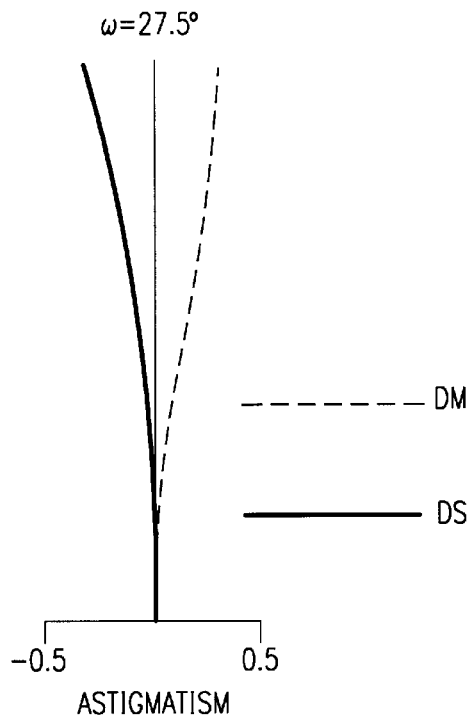
FIGS. 13 and 13B show aberration curves of the sixth embodiment of the eyepiece lens system.
Figure 13B:
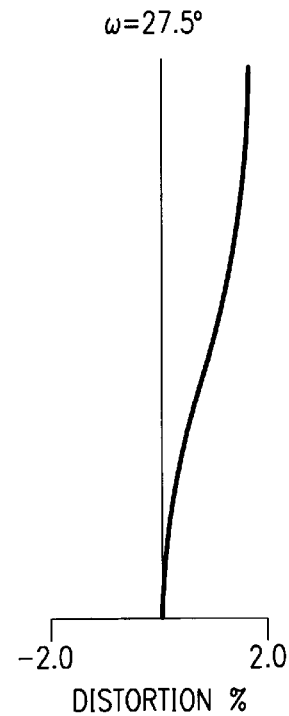
Figure 14A:
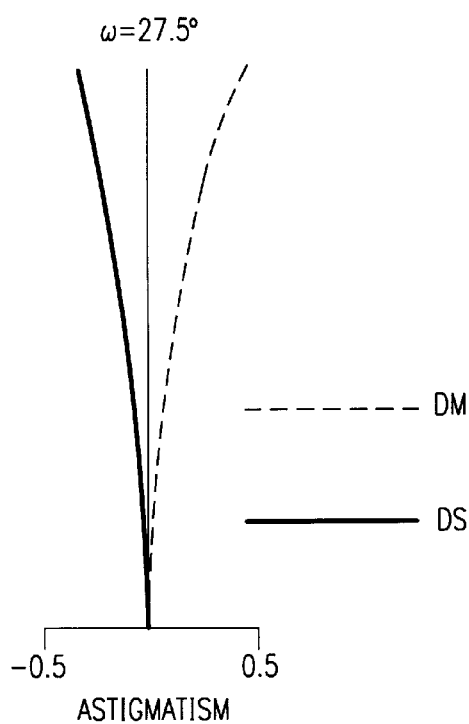
FIGS. 14A and 14B show aberration curves of the seventh embodiment of the eyepiece lens system.
Figure 14B:
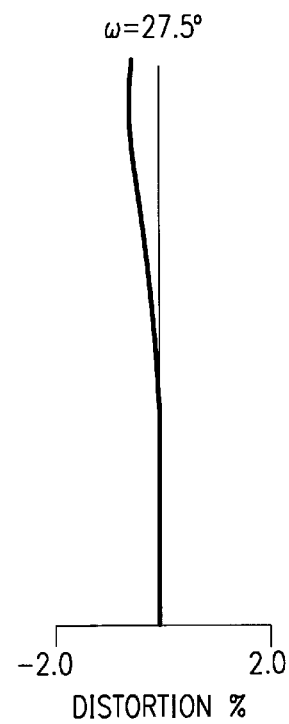

FIGS. 8A through 14A show the astigmatism of each illustrated embodiment of the eyepiece lens system. FIGS. 8B through 14B show the distortion of each illustrated embodiment of the eyepiece lens system. In FIGS. 8A through 14A, the solid line DS represents the astigmatism on the sagittal plane and the broken line DM represents the astigmatism on the merigianal plane. Moreover, ω represents the half angle, in degrees, of the view of the incident beam from the pupil side.

As explained above, the eyepiece lens system of the present invention is able to provide an eyepiece lens system having a long eye-relief, wherein both the field curvature and the distortion are corrected with a good balance.

Therefore, where the eyepiece lens system of the present invention is employed as the photo-taking optical system in a pair of binoculars, a telescope, or a microscope, it contributes to allowing these device to offer superior performance.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

TABLE 1

(1st Embodiment)

| Radius of Curvature | | Axial Distance | Refractive Index | | Abbe number |
|---|---|---|---|---|---|
| r1 | 70.00 | | | | |
| | | d1 4.50 | n1 | 1.49140 | v1 57.8 |
| r2* | −11.76 | | | | |
| | | d2 0.20 | | | |
| r3 | −43.00 | | | | |
| | | d3 3.50 | n2 | 1.49140 | v2 57.8 |
| r4* | −13.00 | | | | |
| | | d4 0.20 | | | |
| r5 | 14.00 | | | | |
| | | d5 7.50 | n3 | 1.71300 | v3 53.9 |
| r6 | −12.43 | | | | |
| | | d6 1.50 | n4 | 1.84666 | v4 23.8 |
| r7 | 22.26 | | | | |

Aspherical Coefficient

| r2* | ε | 0.100 |
|---|---|---|
| | A6 | $-0.150 \times 10^{-6}$ |
| r4* | ε | −0.120 |

Value of Condition (1)

| d0 | 11.000 |
|---|---|
| f | 10.001 |
| φ1 | 0.0479 |
| φ2 | 0.0274 |
| W | 0.758 |

TABLE 2

(2nd Embodiment)

| Radius of Curvature | | Axial Distance | Refractive Index | | Abbe number |
|---|---|---|---|---|---|
| r1 | 300.00 | | | | |
| | | d1 4.50 | n1 | 1.49140 | v1 57.8 |

TABLE 2-continued

| r2* | −10.77 | | | | |
|---|---|---|---|---|---|
| | | d2 0.20 | | | |
| r3 | −43.00 | | | | |
| | | d3 3.50 | n2 | 1.49140 | v2 57.8 |
| r4* | −13.00 | | | | |
| | | d4 0.20 | | | |
| r5 | 14.00 | | | | |
| | | d5 7.20 | n3 | 1.71300 | v3 53.9 |
| r6 | −12.00 | | | | |
| | | d6 1.50 | n4 | 1.84666 | v4 23.8 |
| r7 | 24.00 | | | | |

Aspherical Coefficient

| r2* | ε | 0.070 |
|---|---|---|
| | A6 | $-0.250 \times 10^{-6}$ |
| r4* | ε | 0.450 |

Value of Condition (1)

| d0 | 11.000 |
|---|---|
| f | 10.002 |
| φ1 | 0.0470 |
| φ2 | 0.0273 |
| W | 0.710 |

TABLE 3

(3rd Embodiment)

| Radius of Curvature | | Axial Distance | Refractive Index | | Abbe number |
|---|---|---|---|---|---|
| r1 | 70.00 | | | | |
| | | d1 4.50 | n1 | 1.51680 | v1 64.1 |
| r2 | −14.00 | | | | |
| | | d2 0.20 | | | |
| r3 | −40.00 | | | | |
| | | d3 3.50 | n2 | 1.49140 | v2 57.8 |
| r4* | −10.69 | | | | |
| | | d4 0.20 | | | |
| r5 | 14.50 | | | | |
| | | d5 7.50 | n3 | 1.62041 | v3 60.3 |
| r6 | −11.30 | | | | |
| | | d6 1.50 | n4 | 1.84666 | v4 23.8 |
| r7 | 97.97 | | | | |

Aspherical Coefficient

| r4* | ε | −0.380 |
|---|---|---|
| | A6 | $-0.150 \times 10^{-6}$ |

Value of Condition (1)

| d0 | 9.200 |
|---|---|
| f | 9.999 |
| φ1 | 0.0427 |
| φ2 | 0.0350 |
| W | 0.833 |

TABLE 4

(4th Embodiment)

| Radius of Curvature | | Axial Distance | Refractive Index | | Abbe number |
|---|---|---|---|---|---|
| r1 | 34.00 | | | | |
| | | d1 5.00 | n1 | 1.49140 | v1 57.8 |
| r2* | −9.94 | | | | |
| | | d2 0.20 | | | |
| r3 | −30.00 | | | | |
| | | d3 4.50 | n2 | 1.51680 | v2 64.1 |
| r4 | −11.20 | | | | |

TABLE 4-continued

| | | | | | | |
|---|---|---|---|---|---|---|
| | | d4 | 0.20 | | | |
| r5 | 18.00 | | | | | |
| | | d5 | 7.50 | n3 | 1.62041 | ν3 | 60.3 |
| r6 | −11.50 | | | | | |
| | | d6 | 1.50 | n4 | 1.80518 | ν4 | 25.4 |
| r7 | 50.00 | | | | | |

Aspherical Coefficient

| | | |
|---|---|---|
| r2* | ε | −1.700 |
| | A6 | 0.194 × 10⁻⁵ |

Value of Condition (1)

| | |
|---|---|
| d0 | 11.000 |
| f | 9.802 |
| φ1 | 0.0615 |
| φ2 | 0.0313 |
| W | 0.617 |

TABLE 5

(5th Embodiment)

| Radius of Curvature | | Axial Distance | | Refractive Index | | Abbe number |
|---|---|---|---|---|---|---|
| r1 | 30.00 | | | | | |
| | | d1 | 5.50 | n1 | 1.49140 | ν1 | 57.8 |
| r2* | −10.34 | | | | | |
| | | d2 | 0.20 | | | |
| r3 | −40.00 | | | | | |
| | | d3 | 3.20 | n2 | 1.51680 | ν2 | 64.1 |
| r4 | −15.00 | | | | | |
| | | d4 | 0.20 | | | |
| r5 | 15.00 | | | | | |
| | | d5 | 7.20 | n3 | 1.62041 | ν3 | 60.3 |
| r6 | −12.20 | | | | | |
| | | d6 | 1.50 | n4 | 1.80518 | ν4 | 25.4 |
| r7 | 30.00 | | | | | |

Aspherical Coefficient

| | | |
|---|---|---|
| r2* | ε | −0.800 |
| | A6 | 0.550 × 10⁻⁶ |

Value of Condition (1)

| | |
|---|---|
| d0 | 11.500 |
| f | 9.998 |
| φ1 | 0.0610 |
| φ2 | 0.0225 |
| W | 0.800 |

TABLE 6

(6th Embodiment)

| Radius of Curvature | | Axial Distance | | Refractive Index | | Abbe number |
|---|---|---|---|---|---|---|
| r1 | 40.00 | | | | | |
| | | d1 | 5.50 | n1 | 1.49140 | ν1 | 57.8 |
| r2* | −9.92 | | | | | |
| | | d2 | 0.20 | | | |
| r3 | −30.00 | | | | | |
| | | d3 | 3.20 | n2 | 1.51680 | ν2 | 64.1 |
| r4 | −11.20 | | | | | |
| | | d4 | 0.20 | | | |
| r5 | 19.00 | | | | | |
| | | d5 | 7.20 | n3 | 1.62041 | ν3 | 60.3 |
| r6 | −11.20 | | | | | |
| | | d6 | 1.50 | n4 | 1.80518 | ν4 | 25.4 |
| r7 | 50.00 | | | | | |

Aspherical Coefficient

| | | |
|---|---|---|
| r2* | ε | −1.500 |
| | A6 | 0.140 × 10⁻⁵ |

Value of Condition (1)

| | |
|---|---|
| d0 | 10.000 |
| f | 10.000 |
| φ1 | 0.0596 |
| φ2 | 0.0306 |
| W | 0.657 |

TABLE 7

(7th Embodiment)

| Radius of Curvature | | Axial Distance | | Refractive Index | | Abbe number |
|---|---|---|---|---|---|---|
| r1 | −100.00 | | | | | |
| | | d1 | 3.00 | n1 | 1.51680 | ν1 | 64.1 |
| r2 | −15.000 | | | | | |
| | | d2 | 0.20 | | | |
| r3 | −65.000 | | | | | |
| | | d3 | 4.50 | n2 | 1.49140 | ν2 | 57.8 |
| r4* | −9.893 | | | | | |
| | | d4 | 0.20 | | | |
| r5 | 13.500 | | | | | |
| | | d5 | 7.50 | n3 | 1.71300 | ν3 | 53.9 |
| r6 | −12.000 | | | | | |
| | | d6 | 1.50 | n4 | 1.84666 | ν4 | 23.8 |
| r7 | 23.700 | | | | | |

Aspherical Coefficient

| | | |
|---|---|---|
| r4* | ε | −0.500 |
| | A6 | 0.280 × 10⁻⁶ |

Value of Condition (1)

| | |
|---|---|
| d0 | 10.000 |
| f | 10.000 |
| φ1 | 0.0296 |
| φ2 | 0.0434 |
| W | 0.763 |

That which is claimed is:

1. An eyepiece lens system having a pupil side and an object side, said eyepiece lens system comprising, from the pupil side and proceeding toward the object side:

a first lens unit, having a positive refractive power;

a second lens unit, having appositive refractive power; and a third lens unit, having a positive refractive power;

wherein at least one of said first lens unit and said second lens unit has at least one aspherical surface; and wherein the eyepiece lens system fulfills the following condition:

$$0.55 < \frac{f^3}{d_0} \cdot \left( \frac{\phi_1}{r_1} + \frac{\phi_2}{r_3} + \frac{0.116}{r_5} \right) < 0.85$$

where, f represents a focal length of the entire eyepiece lens system;

$d_0$ represents an eye-relief;

φ₁ represents a refractive power of the first lens unit;
φ₂ represents a refractive power of the second lens unit;
r₁ represents a radius of curvature of a pupil side surface of the first lens unit;
r₃ represents a radius of curvature of a pupil side surface of the second lens unit; and
r₅ represents a radius of curvature of a pupil side surface of the third lens unit.

2. An eyepiece lens system as claimed in claim 1, wherein said eyepiece lens system also fulfills the following condition:

$$\frac{1}{r_1} > 0$$

where $r_1$ represents a radius of curvature of a pupil side surface of the first lens unit.

3. An eyepiece lens system as claimed in claim 1, wherein said first lens unit has an aspherical surface.

4. An eyepiece lens system as claimed in claim 3, wherein an object side surface of said first lens unit is an aspherical surface.

5. An eyepiece lens system as claimed in claim 4, wherein said first lens unit consists of a bi-convex single lens element.

6. An eyepiece lens system as claimed in claim 4, wherein said first lens unit consists of a positive meniscus single lens element whose pupil side surface is concave.

7. An eyepiece lens system as claimed in claim 4, wherein said third lens unit consists of a positive doublet lens element which is composed of a positive single lens element and a negative single lens element cemented together.

8. An eyepiece lens system as claimed in claim 1, wherein said second lens unit has an aspherical surface.

9. An eyepiece lens system as claimed in claim 8, wherein an object side surface of said second lens unit is an aspherical surface.

10. An eyepiece lens system as claimed in claim 9, wherein said second lens unit consists of a positive meniscus single lens element whose pupil side surface is concave.

11. An eyepiece lens system as claimed in claim 10, wherein said third lens unit consists of a positive doublet lens element which is composed of a positive single lens element and a negative single lens element cemented together.

12. The eyepiece lens system as claimed in claim 1, wherein each of said first lens unit and said second lens unit has an aspherical surface.

13. An eyepiece lens system as claimed in claim 12, wherein an object side surface of said first lens unit is an aspherical surface, and wherein an object side surface of said second lens unit is an aspherical surface.

14. An eyepiece lens system as claimed in claim 13, wherein said first lens unit consists of a bi-convex single lens element.

15. An eyepiece lens system as claimed in claim 14, wherein said second lens unit consists of a positive meniscus single lens element whose pupil side surface is concave.

16. An eyepiece lens system as claimed in claim 15, wherein said third lens unit consists of a positive doublet lens element which is composed of a positive single lens element and a negative single lens element cemented together.

17. An eyepiece lens system as claimed in claim 13, wherein said first lens unit consists of a positive meniscus single lens element whose pupil side surface is concave.

18. An eyepiece lens system as claimed in claim 17, wherein said second lens unit consists of a positive meniscus single lens element whose pupil side surface is concave.

19. An eyepiece lens system as claimed in claim 18, wherein said third lens unit consists of a positive doublet lens element which is composed of a positive single lens element and a negative single lens element cemented together.

20. An eyepiece lens system as claimed in claim 1, wherein said first lens unit consists of a bi-convex single lens element.

21. An eyepiece lens system as claimed in claim 1, wherein said first lens unit consists of a positive meniscus single lens element whose pupil side surface is concave.

22. An eyepiece lens system as claimed in claim 1, wherein said second lens unit consists of a positive meniscus single lens element whose pupil side surface is concave.

23. An eyepiece lens system as claimed in claim 1, wherein said third lens unit consists of a positive doublet lens element which is composed of a positive single lens element and a negative single lens element cemented together.

24. An eyepiece lens system as claimed in claim 23, wherein said positive single lens element is a bi-convex single lens element, and wherein said negative single lens element is a bi-concave single lens element.

25. An eyepiece lens system as claimed in claim 24, wherein said positive single lens element is positioned between said second lens unit and said negative single lens element.

* * * * *